United States Patent [19]
Petty

[11] Patent Number: 5,959,566
[45] Date of Patent: Sep. 28, 1999

[54] METHOD AND SYSTEM FOR DETECTING MOVING OBJECTS USING A SYNTHETIC APERTURE RADAR SYSTEM

[75] Inventor: Joe V. Petty, Highlands Ranch, Colo.

[73] Assignee: Lockheed Martin Corporation, Bethesda, Md.

[21] Appl. No.: 09/049,499

[22] Filed: Mar. 27, 1998

[51] Int. Cl.$^6$ .................................................. G01S 13/90
[52] U.S. Cl. ............................................. 342/25; 342/160
[58] Field of Search ............................ 342/25, 160, 161, 342/162; 382/103; 702/143

[56] References Cited

U.S. PATENT DOCUMENTS

| | | |
|---|---|---|
| 3,735,400 | 5/1973 | Sletten et al. . |
| 3,787,840 | 1/1974 | Dotson . |
| 3,787,849 | 1/1974 | Sletten et al. . |
| 3,975,734 | 8/1976 | Payne . |
| 4,053,885 | 10/1977 | Tomita et al. . |
| 4,086,590 | 4/1978 | Goggins, Jr. . |
| 4,217,583 | 8/1980 | Hiller et al. . |
| 4,559,537 | 12/1985 | Pearson, Jr. et al. . |
| 4,855,747 | 8/1989 | Steinberg ................................ 342/179 |
| 5,122,803 | 6/1992 | Stann et al. ................................ 342/25 |
| 5,539,408 | 7/1996 | Moreira et al. ............................ 342/25 |
| 5,563,601 | 10/1996 | Cataldo ..................................... 342/25 |

OTHER PUBLICATIONS

Carrara, Walter G., "Spotlight Synthetic Aperture Radar: Signal Processing Algorithms," 1995, pp. 236–243.

*Primary Examiner*—Daniel T. Pihulic
*Attorney, Agent, or Firm*—Holme Roberts & Owen LLP

[57] ABSTRACT

A method and system for detecting moving objects using azimuth streaks in synthetic aperture radar (SAR) image data are disclosed. The method and system of the present invention are directed to processing amplitude data relating to a SAR image, the first amplitude data having at least first and second indications corresponding to at least a first object moving at a substantially constant linear velocity and clutter, respectively, to separate or filter at least the first indication from the second indication, reducing/altering a spatial frequency power of the clutter corresponding to the second indication relative to a first azimuth streak power of a first azimuth streak corresponding to the first indication, and thresholding a first amplitude of the first azimuth streak to detect the first azimuth streak.

37 Claims, 11 Drawing Sheets

Less than 1% of Spatial Frequency Domain
Contains 90% of Power due to Azimuth Streaking Spatial Frequency Domain

5,959,566

METHOD AND SYSTEM FOR DETECTING MOVING OBJECTS USING A SYNTHETIC APERTURE RADAR SYSTEM

FIELD OF THE INVENTION

The present invention generally relates to a method and system for processing image data from a synthetic aperture radar system and, in particular, to a method and system for detecting moving objects by processing image data from a synthetic aperture radar system.

BACKGROUND OF THE INVENTION

Radio detection and ranging (radar) devices generally include a transmitter for illuminating an object with radio frequency energy "pulses" and a receiver for receiving energy reflected from the object. For instance, a single radio frequency pulse transmitted toward an object from the radar device will provide the distance from the radar transmitter to the object which reflected the energy. Resolution of images using conventional radar systems can be low, however.

Conventional synthetic aperture radar (SAR) systems are capable of providing a higher degree of resolution since SAR systems have a relatively large effective aperture size. More specifically, a synthetic aperture is created by putting a transmitter on a moving vehicle (e.g., airplane). As the vehicle moves a known distance at a constant velocity, the transmitter on board the vehicle transmits toward a designated object or area to be illuminated pulses of radio frequency energy over a period of time. In this regard, the resulting aperture effectively corresponds to the distance the vehicle moved during the period of time the transmitter was pulsing energy toward the designated object or area, which is significantly larger than the aperture of the typical radar systems.

Typically, for a conventional side looking SAR system mounted on board an aircraft, as the aircraft flies in the "along track" (i.e., azimuth) direction at a constant velocity, the radar antenna transmits a series of periodic radio frequency energy pulses to image a strip, and various stationary objects within the strip (e.g., on the ground) reflect radio frequency energy back to the SAR. As the radar antenna pulses periodically as it flies along in the azimuth direction, the distance between a given stationary radio frequency reflector or scatterer and the antenna/transmitter varies, whereby the distance is at a minimum at the point where the antenna/transmitter is broadside the stationary scatterer. Such distances can be processed to provide the location of the stationary object or objects reflecting or scattering the radio frequency energy within the strip being imaged.

In addition to distance, such conventional side looking SAR systems have also been used to produce images of the stationary objects (e.g., scatterers) reflecting or scattering the radio frequency energy within the strips. Initially, it should be noted that images from SAR systems are viewed from an "above the strip, downward looking" perspective, as opposed to a view from the flight path of the SAR system, which is off to a side of the imaged strip. Generally, two-dimensional images of illuminated strips have been produced. The two dimensions are the range (e.g., cross track) resolution and the azimuth (e.g., along track, perpendicular to range) resolution. As noted hereinabove, the range corresponds to the distance between the SAR and the stationary scatterer. The range resolution (e.g., degree of accuracy of stationary scatterer's position in the range direction) is typically dependent upon the width of the radio frequency pulses which are transmitted. Azimuth resolution (e.g., degree of accuracy of scattering object's position in the azimuth direction) is dependent upon the length of the synthetic aperture, which generally corresponds to the distance flown by the antenna of the SAR system. In particular, the azimuth position is dependent upon a scattering object's Doppler frequency of the reflected energy, which corresponds to the position of the SAR system relative to the scattering object. Processing of Doppler frequency shifts or offsets provides a location of scatterers in a scene being illuminated.

Of importance, for conventional side looking SAR systems, there is a fundamental assumption that all scatterers or targets in a strip or scene being illuminated remain stationary during the collection period so that the Doppler shift will behave properly to precisely locate the position of all scatterers in azimuth. If a scatterer is a moving object (e.g., an object with a constant or variable linear or nonlinear velocity, wind-blown trees or foliage, ships at harbor moving due to wave motion, etc.) within the scene or strip being illuminated, azimuth streaking can result as the Doppler shift incurs change due to the along track velocity of the moving scatterer. As such, there is a need to discern between azimuth streaking due to scatterers moving with a constant linear velocity, which are typically of primary interest, and azimuth streaking due to false movers or scatterers which are not moving at a constant linear velocity (e.g., clutter or background). Such discernment, however, has been especially problematic in instances where the reflected energy from the clutter or background, which can include wind-blown trees, foliage or the like, is greater than the reflected energy from the scatterers moving at a constant linear velocity (e.g., low signal-to-background scatterers), which are typically the targets of primary interest. In such instances, azimuth streaking from such low signal-to-background scatterers moving at a constant linear velocity has not been detectable. This is especially problematic for space-based SAR systems, which are typically single aperture systems, rather than multi-aperture systems, due to weight and power constraints.

SUMMARY OF THE INVENTION

Accordingly, it is an object of the present invention to provide a method and system for detecting at least a first azimuth streak corresponding to a first moving object (e.g., scatterer) using data from a synthetic aperture radar system.

It is another object of the present invention to provide a method and system for detecting at least a first azimuth streak corresponding to at least a first moving object using data from a space-based synthetic aperture radar system.

It is still another object of the present invention to provide a method and system for detecting at least a first azimuth streak corresponding to at least a first low signal-to-background object moving at a constant linear velocity using data from a single or multiple channel synthetic aperture radar system.

It is yet another object of the present invention to provide a method and system for obtaining at least an estimate of the velocity of at least a first moving object using data from a synthetic aperture radar system.

The present invention achieves one or more of the above-identified objects by providing a method and system for detecting azimuth streaks which correspond to scatterers (e.g., objects, targets, etc.) moving at a substantially constant linear velocity. The method and system of the present invention utilize at least first amplitude data corresponding to a first image or image data received from or collected by a synthetic aperture radar (i.e., SAR) system. Generally, in one aspect, the method and system of the present invention are directed to processing at least the first amplitude data relating to the first image, the first amplitude data having at least first and second indications corresponding to at least the first moving object and clutter, to separate or filter at least the first indication from the second indication, and reducing/altering a spatial frequency power of the clutter corresponding to the second indication relative to a first azimuth streak power of a first azimuth streak corresponding to the first indication. Of importance, by reducing the spatial frequency power of the clutter relative to the first azimuth streak power of at least the first azimuth streak, at least the first azimuth streak is detectable. Such reduction is especially important to detect azimuth streaks from low signal-to-background scatterers moving at a constant linear velocity (e.g., land-based movers, such as cars, trucks, tanks, sea-based movers, such as ships and boats, and air-based movers, such as airplanes and helicopters), since the azimuth streaks would have heretofore otherwise been undetectable.

In one embodiment of the present invention, reduction of the spatial frequency power of the clutter relative to at least the first azimuth streak power of at least the first azimuth streak is performed in the amplitude spatial frequency domain. Generally, in this embodiment, the method and system are directed to receiving at least first amplitude data in an amplitude image domain of at least a first image from a SAR system (e.g., side looking SAR system), the first amplitude data including first and second indications corresponding to at least a first moving object (e.g., scatterer moving at a constant linear velocity) and clutter or background (e.g., object(s), such as air, sea or land-based vehicles, moving nonlinearly or at nonconstant linear velocity, stationary or wind-blown trees and foliage, roads, buildings, etc.), respectively, processing at least the first indication to concentrate a spatial frequency of at least a first azimuth streak power of at least a first azimuth streak corresponding to the first moving object within an amplitude spatial frequency domain, whitening, in the amplitude spatial frequency domain, at least a portion of the second indication to lower the spatial frequency power of the clutter relative to at least the first azimuth streak power, filtering the amplitude spatial frequency domain to zero out the spatial frequency power of the clutter, processing the spatial frequency of at least the first azimuth streak power to disperse or unconcentrate the spatial frequency of at least the first azimuth streak power into the amplitude image domain, such that at least the first azimuth streak has a first azimuth amplitude, and thresholding the first azimuth amplitude of the first azimuth streak corresponding to the first moving object relative to a first selected amplitude level, wherein the first azimuth streak is detectable if the first azimuth amplitude of the first azimuth streak is greater than the first selected amplitude level. Of importance, the method and system of the present invention are especially useful for detecting azimuth streaks from low signal-to-background objects or targets since the whitening step defeats or suppresses the clutter for low signal-to-background targets or movers by significantly reducing the clutter, which would otherwise result in azimuth streaks for false (e.g., nonexistent, no-interest) movers. Whitening, in the amplitude spatial frequency domain, of at least a portion of the second indication corresponding to clutter or background may be performed before or after filtering of the amplitude spatial frequency domain, so long as the whitening is performed prior to processing the spatial frequency of at least the first azimuth streak power to disperse the spatial frequency of at least the first azimuth streak power into the amplitude image domain.

In another embodiment of the method of the present invention, reduction of the clutter relative to the first azimuth streak is accomplished by whitening of the clutter amplitude in the amplitude image domain. Generally, in this embodiment, the method and system are directed to receiving at least first amplitude data in an amplitude image domain of at least a first image from a SAR system (e.g., side looking SAR system), the first amplitude data including first and second indications corresponding to at least a first moving object (e.g., scatterer moving at a constant linear velocity) and clutter or background (e.g., object moving nonlinearly or at nonconstant linear velocity, stationary or wind-blown trees and foliage, etc.), respectively, whitening, in the amplitude image domain, at least one of the first and second indications of the first amplitude data (e.g., first azimuth amplitude of the first azimuth streak and clutter amplitude), such that the spatial frequency power of the clutter is altered or reduced relative to at least the first azimuth streak power, processing at least the first indication to concentrate the spatial frequency of at least a first azimuth streak power of at least a first azimuth streak corresponding to the first moving object within an amplitude spatial frequency domain, filtering the amplitude spatial frequency domain to zero out the spatial frequency power of the clutter, processing the spatial frequency of at least the first azimuth streak power to disperse or unconcentrate the spatial frequency of at least the first azimuth streak power into the amplitude image domain, such that at least the first azimuth streak has a first azimuth amplitude, and thresholding the first azimuth amplitude of at least the first azimuth streak corresponding to the first moving object relative to a first selected amplitude level, wherein the first azimuth streak is detectable if the first azimuth amplitude of the first azimuth streak is greater than the first selected amplitude level. In this embodiment, whitening is accomplished in the amplitude image domain by convolving with a first weighted matrix the first and second indications to alter the spatial frequency power of the clutter, such that the spatial frequency power of the clutter is less than the first azimuth streak power. Such convolution of the amplitude image data may be performed before or after the separating/filtering of the data in the amplitude spatial frequency domain. The values in the first weighted matrix may be synthesized by standard Fourier techniques so that the response in the spatial frequency domain is approximately constant amplitude. As noted hereinabove, the method and system are especially useful for detecting azimuth streaks caused by low signal-to-background objects or targets as whitening the clutter defeats or suppresses the clutter for low signal-to-background targets or movers by significantly reducing the clutter, which would otherwise result in azimuth streaks corresponding to false (e.g., nonexistent or no-interest) movers.

Processing to separate/filter the first and second indications in either of the above-summarized embodiments may be accomplished utilizing either a discrete Fourier transformation or an optical Fourier transformation, depending, for example, upon whether the SAR system amplitude data is digital or analog in nature. In view of the frequency shifts noted hereinabove with respect to obtaining azimuth resolution, two dimension Fourier transforms are central to the method and system of the present invention since Fourier transforms by their very definition are frequency, rather than spatially, oriented. In particular, the processing step for concentrating the spatial frequency of at least the first azimuth streak power of at least the first azimuth streak may include performing a two-dimensional discrete Fourier transform (e.g., for digital amplitude data) or a two-dimensional optical Fourier transform (e.g., for analog amplitude data) on at least the first indication in the amplitude image domain to arrange at least the spatial frequency of at least the first azimuth streak power of at least the first azimuth streak within the amplitude spatial frequency domain. Further, the processing step for dispersing the spatial frequency of at least the first azimuth streak power into the amplitude image domain may include performing an inverse two-dimensional discrete Fourier transform (e.g., for digital amplitude data) or an inverse two-dimensional optical Fourier transform (e.g., for analog amplitude data) on at least the spatial frequency of at least the first azimuth streak power in the spatial frequency domain to obtain at least the first azimuth amplitude of the first azimuth streak in the amplitude image domain.

In another aspect of the present invention, a method and system for detecting at least a first azimuth streak corresponding to at least a first object moving at a substantially constant linear velocity is achieved. Generally, the method and system are directed to convolving a weighted matrix with first and second indications of the first amplitude data corresponding to a first image from a SAR system, the first and second indications corresponding to at least the first object or target moving at a substantially constant linear velocity, and clutter or background, respectively, to alter and filter out a spatial frequency power of the clutter relative to a first azimuth streak power of at least a first azimuth streak corresponding to the first object moving at least substantially constant linear velocity. In this regard, the processing steps described hereinabove which utilized two-dimensional Fourier transforms and inverse two-dimension Fourier transforms to manipulate at least the first amplitude data out of the amplitude image domain and into amplitude spatial frequency domain, and vice versa, and filtering step, may be incorporated into the convolving step via the weighted matrix. The method may further include the step of thresholding at least a first azimuth amplitude of at least the first azimuth streak with a first selected amplitude level, wherein the first azimuth streak is detectable if the first azimuth amplitude of the first azimuth streak is greater than the first selected amplitude level. Of importance, the method and system are especially useful in detecting low signal-to-background targets or objects moving at a substantially constant linear velocity since the method and system reduce the azimuth streaks relating to false movers, which would otherwise result from the clutter.

The value of the azimuth streak detection method and system of the present invention is likely to be as a detection process which precedes more sophisticated, but possibly more ill-conditioned classification, or identification type statistical processes. The method and system of the present invention provide a robust detector which would improve the performance of any following classifier, or identifier according to the laws of conditional probability. Specifically, ill-conditioned classification, or identification type statistical processes are typically plagued by high false alarm rates. False movers are precisely what the method and system of the present invention are designed to avoid.

For purposes of obtaining a rough estimate of the velocity of at least the first moving object, the method and system of the present invention may be utilized for second amplitude data relating to second image data taken a known period of time after the first image was collected, assuming that the first moving object is included in the first and second image collections. In particular, the method of the present invention may be repeated for the second amplitude data corresponding to the second image of at least the first moving object. Repeating the above-summarized method may result in detection of a second azimuth streak corresponding to the first moving object. The first and second azimuths streaks of the first and second images, respectively, correspond to the first moving object in first and second positions, respectively. In this regard, a rough estimate of the velocity of the first moving object may be determined using the first and second positions of the first and second azimuth streaks corresponding to the first moving object and the period of time elapsed between collection of the first and second image data relating to first and second images collected by the SAR system.

DETAILED DESCRIPTION OF THE INVENTION

FIGS. 1–9 illustrate the various features of the method and system of the present invention. Generally, the method and system of the present invention are directed to processing image data relating to images collected by synthetic aperture radar systems to detect moving objects. The method and system of the present invention are especially useful for detecting low signal-to-background objects or targets moving at a substantially constant linear velocity.

Figure 1:
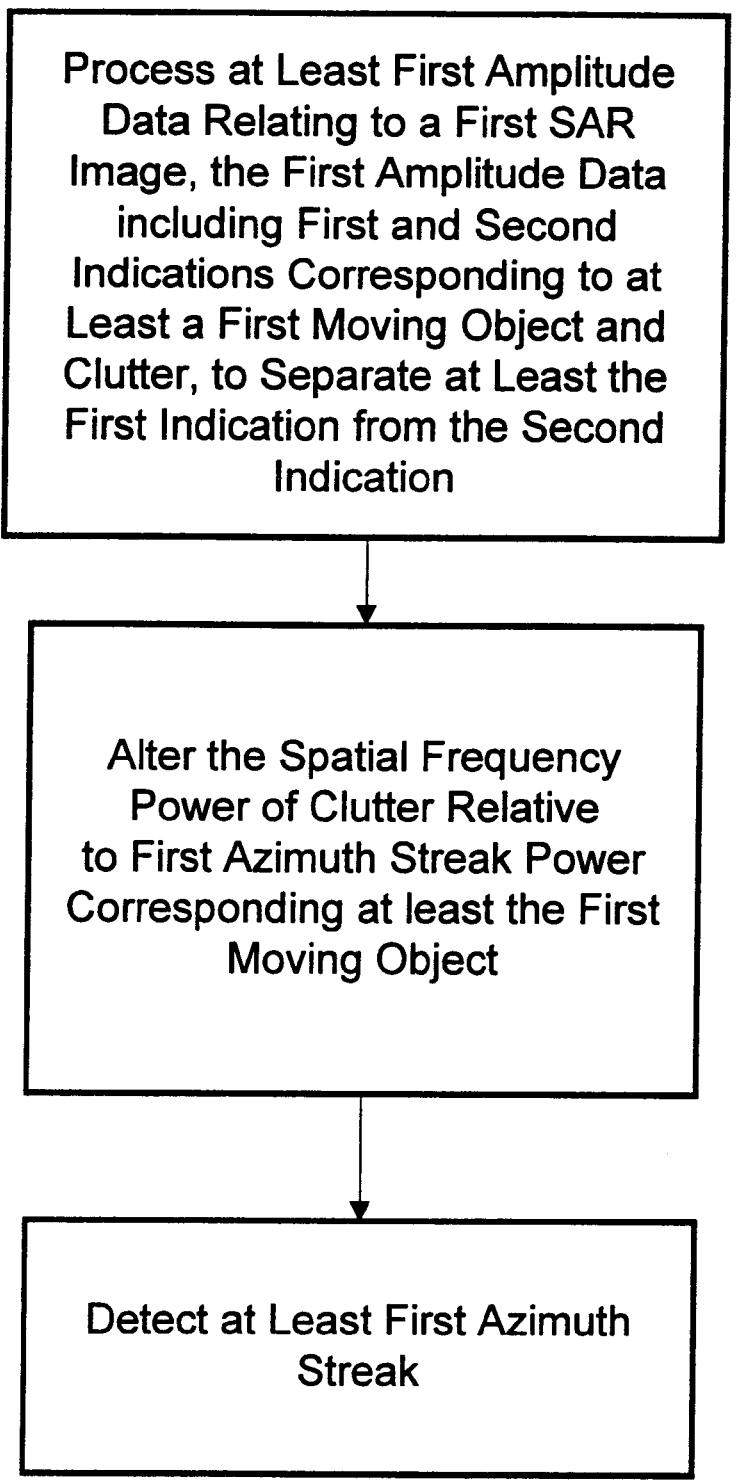
FIG. 1 is a flow chart illustrating one embodiment of the method of the present invention.

More particularly, and referring to FIG. 1, the method of the present invention generally includes the steps of processing at least first amplitude data corresponding to a first image collected by a synthetic aperture radar system, the first amplitude data having at least first and second indications which correspond to at least a first moving object and clutter or background, to separate/filter the first and second indications, reducing the clutter relative to a first azimuth streak corresponding to the first moving object, and detecting at least the first azimuth streak.

Initially, it should be noted that the first image from the synthetic aperture radar system may be a complex image. In this regard, in one embodiment, the method of the present invention initially involves the step of transforming at least a first complex image into first amplitude data. In one embodiment, the first complex image is a 32-bit floating point for each of the in-phase (e.g., real part) and for the quadrature (e.g., imaginary part). In this regard, for a complex synthetic aperture image denoted as "z":

$$z = x + jy;$$

where each of "x" and "y" is a real number, "x" being the in-phase component and "y" being the quadrature component; and "j" is defined by:

$$j^2 = -1$$

The amplitude, $\|z\|$, of the first complex image (e.g., first amplitude data of the first image) may be obtained by taking the square root of the in-phase component, squared (i.e., $x^2$) plus the quadrature component, squared (i.e., $y^2$). The phase of the complex image is the standard four quadrant inverse tangent of the ratio "y/x" ranging from $-180°$ to $+180°$, for "x" non-zero.

It should initially be noted that the method and system of the present invention for detecting azimuth streaks corresponding to scatterers or objects moving at a substantially constant linear velocity utilizes primarily the amplitude of the image data from a SAR system, and does not utilize the phase in the basic detection process. The reason for the direct avoidance of the phase component of the SAR image data is that given the observation of a noise-free signal "s", which can in general be any signal of one or two dimensional complex exponential form:

$$s = A \exp [j\Phi] = A \cos(\Phi) + j A \sin(\Phi),$$

where "A" is a positive constant, "$\Phi$" is varying, and neither "A" nor "$\Phi$" is known;
then "$\Phi$" can be extracted by computing:
$\Phi = \arctan[r]$, where the ratio "r" is given by:

$$r = A \sin(\Phi)/A \cos(\Phi).$$

As such, $r = \sin(\Phi)/\cos(\Phi)$.
If the following is observed:

$$s = A \exp [j\Phi] + w,$$

where "w" is noise defined by:

$$w = x + jy, \text{ with } E[x] = E[y] = 0, \text{ and}$$

$$\text{Var}[x] = \text{Var}[y] = \sigma^2,$$

and "x," "y" are statistically independent Gaussian variates, then the above procedure to extract the phase "$\Phi$" becomes the calculation of "$\arctan[R]$," where "R" is given by:

$$R = \{A \sin(\Phi) + x\}/\{A \cos(\Phi) + y\} = \{\sin(\Phi) + [x/A]\}/\{\cos(\Phi) + [y/A]\}.$$

The ratios "x/A," "y/A" are key to the behavior of "R," in that the more "$\sigma$" dominates "A", the more "R" becomes approximately the ratio two zero mean Gaussian variate with the same variance, and hence approximates a Cauchy variate. Then "$\arctan[R]$" is uniformly distributed over the chosen domain of the inverse tangent function, which is the most undesirable statistical situation, since every value of the inverse tangent is equally likely, making the extraction of the given "$\Phi$" extremely difficult. Conversely, the more "A" dominates "$\sigma$", the more "R" becomes approximately "$\sin(\Phi)/\cos(\Phi)$," so that "$\Phi$" can be extracted with small error. For low signal-to-background targets, the case "$\sigma$" dominates "A" prevails with the corresponding undesirable statistical situation to contend with. However, phase characteristics can be investigated as a discriminator of wind-blown vegetation azimuth streaking which is detected by the method of the present invention, as well as for the rejection of other false movers.

It should be further noted that the method and system of the present invention assumes that the format of the image data from a SAR system is consistent. Specifically, for the below-described embodiments of the method and system of the present invention, it is assumed that azimuth streaking is always oriented horizontally. However, any other, known, consistent, determinable orientation of azimuth streaking would work equally well. For example, the Shuttle Imaging Radar (SIR-B) has azimuth streaking, if any, oriented in the digital amplitude image, whereas ASARS-2 has azimuth streaking, if any, oriented vertically. For some SAR systems, digital amplitude imagery is transformed to the tangent plane of the earth's surface and is rotated to north to be used in conjunction with standard maps, in which case azimuth streaking, if any, could occur at any orientation angle.

As described hereinabove, the first image may be a complex image having a 32-bit floating point for each of the in-phase, or real part, and for the quadrature, or imaginary part, and may be transformed into amplitude data (e.g., first amplitude data). In one embodiment of the method of the present invention, illustrated in FIGS. 2A–2B, the method initially includes the step of receiving first amplitude data in an amplitude image domain, the first amplitude data corresponding to a first image collected by a SAR system (e.g, single or multiple channel SAR on spacecraft or aircraft), and including first and second indications corresponding to at least a first moving object or scatterer and clutter, respectively.

Figure 2A:
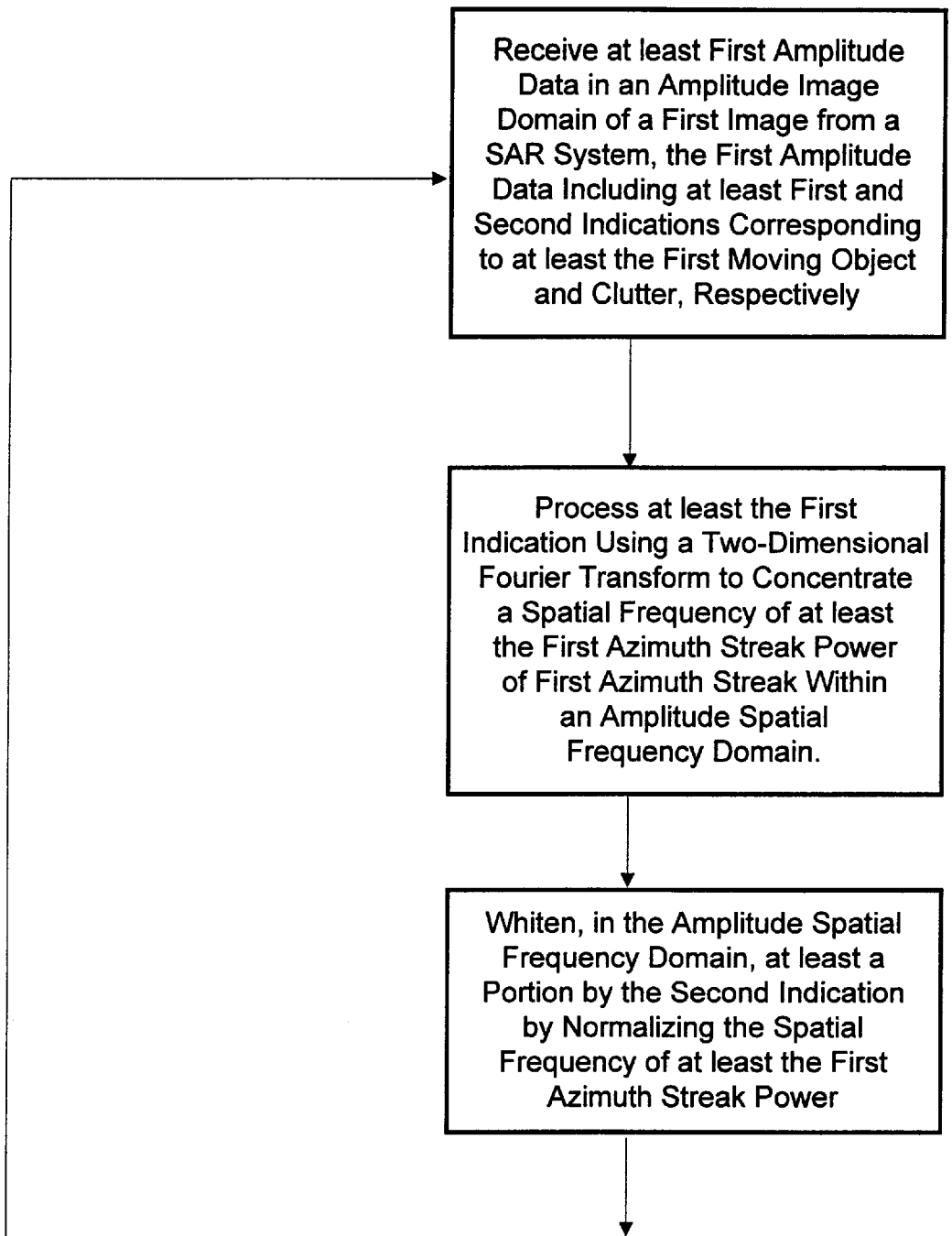
FIGS. 2A–2B is a flow chart illustrating another embodiment of the method of the present invention.
Figure 2B:
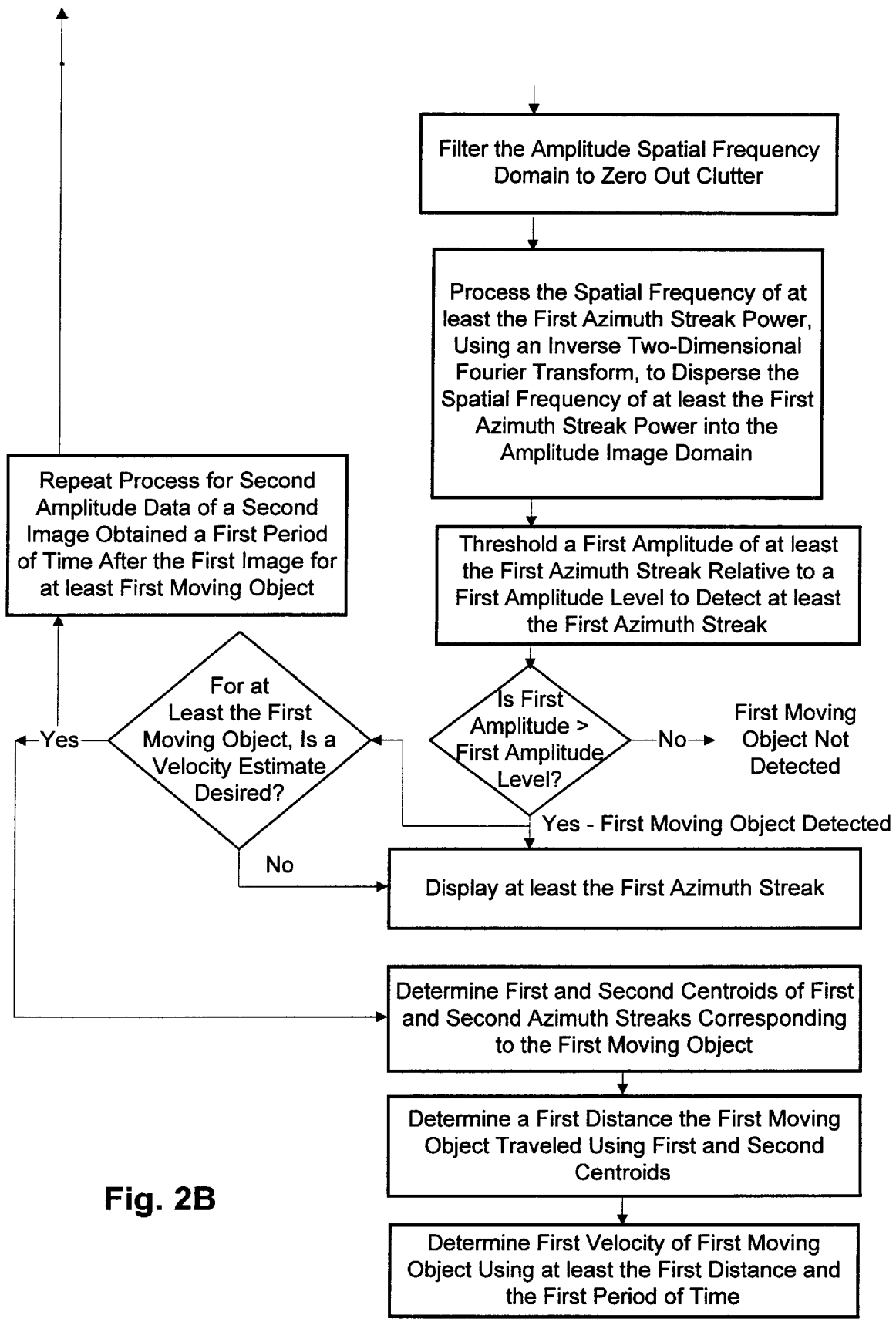
Figure 3:
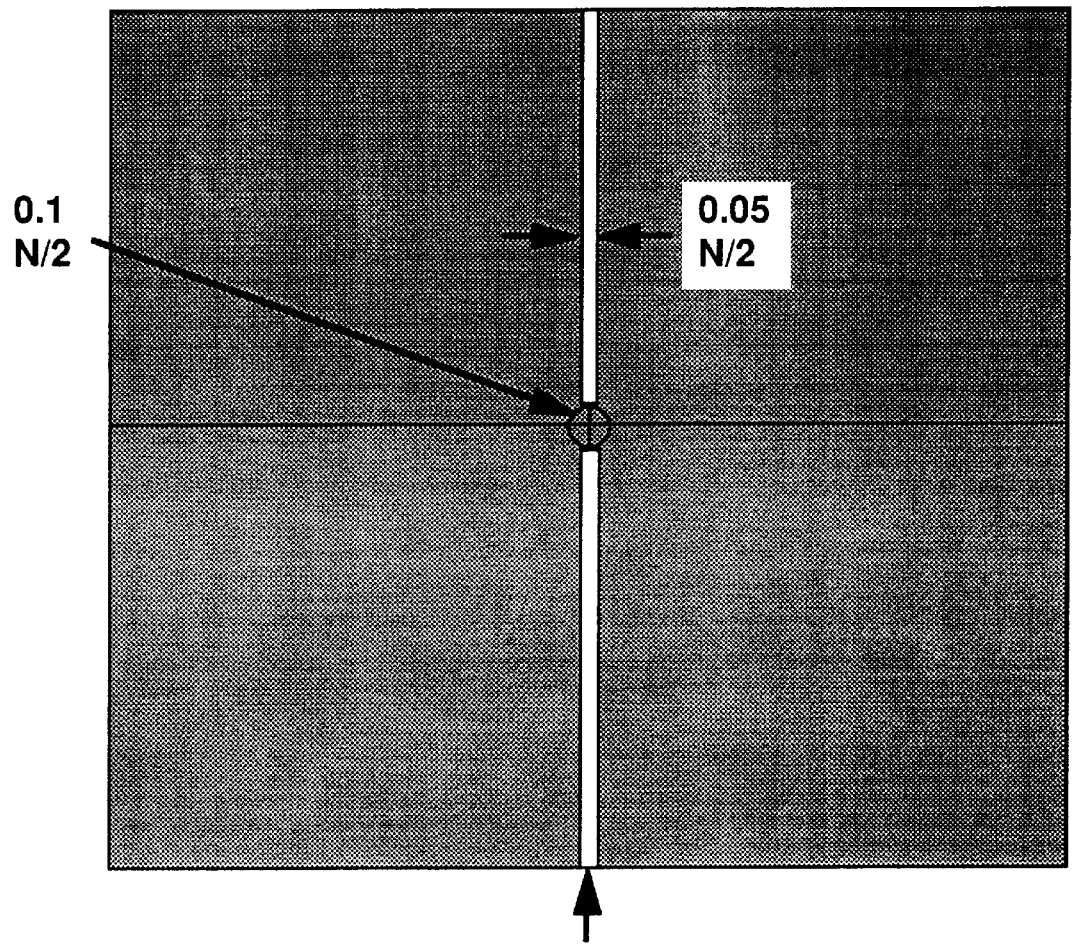
FIG. 3 is a diagram of the spatial frequency domain.

As illustrated in FIG. 3, the spatial frequency of azimuth streaking power of an "N by N" amplitude image (e.g., first image) is concentratable within the total spatial frequency domain, illustrated as the unshaded region in FIG. 3. The standard convention of representing the cardinal axes rotated 90° is employed so that the horizontal azimuth streaking (e.g., related to the first object moving at a substantially constant linear velocity) is oriented vertically in the spatial frequency domain, and the center of the diagram of FIG. 3 is 0 Hz, 0 Hz. Ninety percent (90%) of the azimuth streaking power due to azimuth streaking occurs in one percent (1%) of the spatial frequency domain. In this regard, any azimuth streaking corresponding to objects or targets moving at a substantially constant linear velocity which occurs in the first image from the SAR system is very compactly contained within the spatial frequency of the amplitude SAR image, which makes it easier to manipulate for detection of azimuth streaking in accordance with the system and method of the present invention. As such, and given the assumption that any azimuth streaking is always oriented horizontally, the method of the present invention, illustrated in FIGS. 2A–2B, further includes the step of processing at least the first indication of the first amplitude data in the amplitude image domain to concentrate a spatial frequency of at least a first azimuth streak power of a first azimuth streak, if any, within an amplitude spatial frequency domain. In instances where the first amplitude data is digital, the processing step to concentrate the first amplitude data from the amplitude image domain into the amplitude spatial frequency domain is performed using a two-dimensional discrete Fourier transforms since Fourier transforms are frequency oriented. The definition of a two-dimensional discrete Fourier transform is provided hereinbelow for an "N by N" input data set:

$$D(u, v) = (1/N) \Sigma\Sigma d(x, y)(\exp [-j2 \pi(ux+vy)/N]),$$

where $d(x, y)$, $x = 0, \ldots, N-1$, $y = 0, \ldots, N-1$ and the double summation is over $u = 0, \ldots, N-1$, $v = 0, \ldots, N-1$.

In one embodiment, the azimuth streak power of at least the first azimuth streak corresponding to the first moving object is concentrated into less than one percent (1%) of the spatial frequency domain, as noted in FIG. 3. In other instances, where the first amplitude data is analog, the processing step is performed using a two-dimensional optical Fourier transform.

For purposes of reducing the clutter relative to at least the first azimuth streak in the amplitude spatial frequency domain, the method illustrated in FIGS. 2A–2B further includes the step of whitening at least a portion of the second indication corresponding to the clutter. Specifically, whitening is accomplished by normalizing the spatial frequency of at least the first azimuth streak power, which is the complex output of the two dimensional Fourier transform described hereinabove. In particular, every complex value "z" output from the two-dimensional Fourier transform is transformed to "z/∥z∥", where "∥z∥" is defined as the amplitude of "z". In this regard, normalization is used to defeat/reduce clutter by virtue of the whitening effect the normalization has on the clutter.

Referring to FIGS. 2A–2B, this embodiment of the method of the present invention further includes the step of filtering the amplitude spatial frequency domain to zero out the clutter. Specifically, the filtering step includes deleting or rejecting that part of the spatial frequency that does not contain azimuth streaking. In this regard, and referring to FIG. 3, the shaded region is set to zero and the unshaded region, which is passed (e.g., unmodified), contains over ninety percent (90%) of the azimuth streaking from all sources which exist in the input SAR image (e.g., first image) as in described hereinabove. As such, the filtering step functions to pass azimuth streaking power for later processing to detect moving targets using a statistical thresholding method (which will be described in more detail hereinbelow). It should be noted that the notch can be rotated to pass azimuth streaking from SAR imagery which has azimuth streaking at any orientation angle by virtue of the Fourier Rotation Theorem. In one embodiment, a notch filter is used for the filtering step.

In order to return to the amplitude image domain, the method of the present invention, illustrated in FIGS. 2A–2B, further includes the step of processing the spatial frequency of at least the first azimuth streak power to disperse the spatial frequency of at least the first azimuth streak power of the first azimuth streak back into the amplitude image domain. In this regard, a first amplitude of the first azimuth streak (e.g., first azimuth amplitude) in the amplitude image domain is obtainable. In instances where the first image data from the SAR system is digital in nature, the processing step is performed utilizing an inverse two-dimensional discrete Fourier transform. Alternatively, where the image data is analog in nature, the processing step is performed utilizing an inverse two-dimensional optical Fourier transform.

For purposes of detecting at least the first object moving at a substantially constant linear velocity, this embodiment of the method of the present invention further includes the step of thresholding at least the first amplitude of the first azimuth streak, if any, with a first selected amplitude level. Specifically, the first azimuth amplitude corresponding to the first moving object is thresholded in accord with standard statistical thresholding techniques with azimuth streaking in the image revealed to cue detection of moving targets. In this regard, if the first azimuth amplitude is greater than the first selected amplitude level, then the first azimuth streak, and therefore the first object moving at a substantially constant linear velocity corresponding thereto, is detectable. Thereafter, the first azimuth streak may be displayed in a first image with the background for perspective.

Figure 4A:
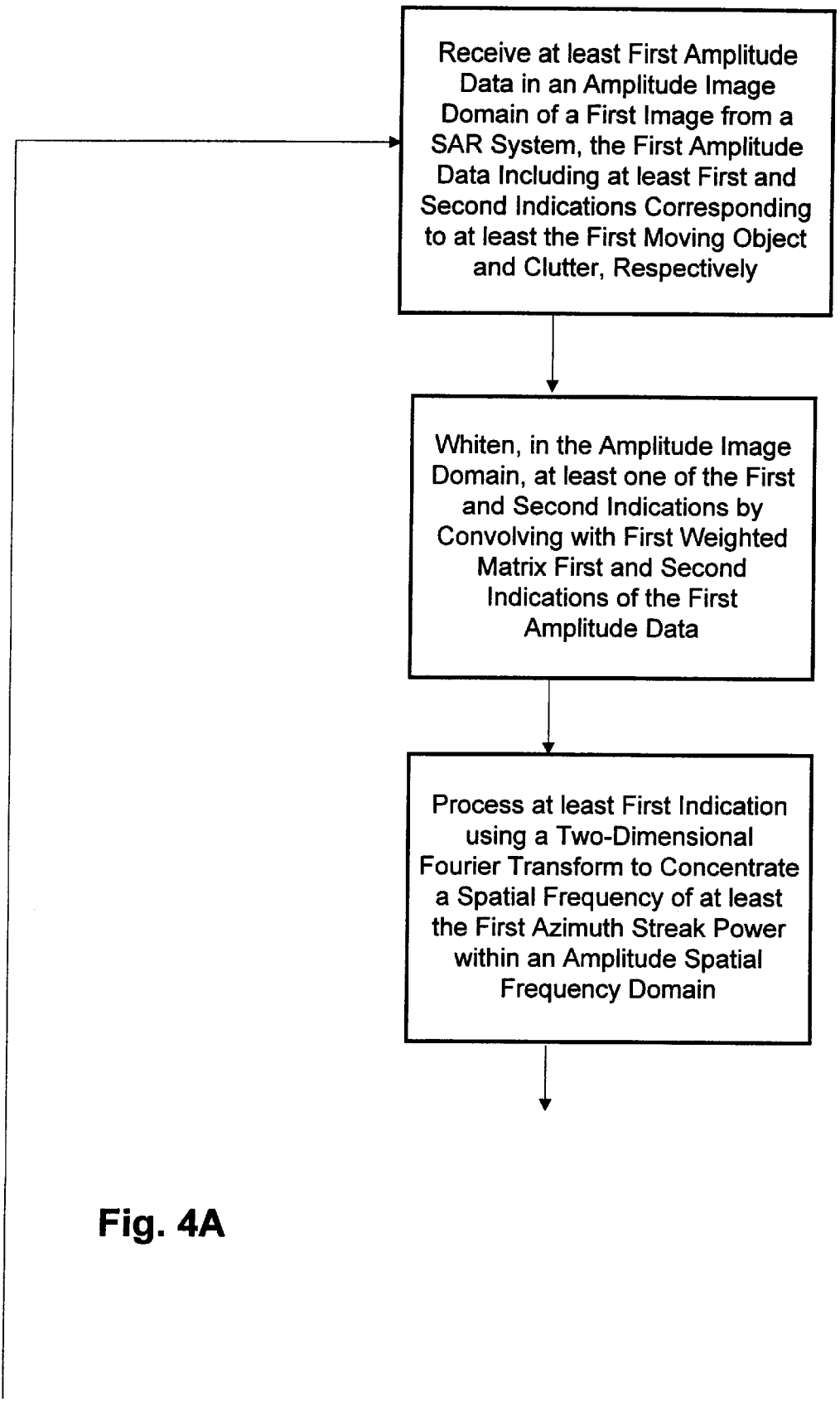
FIGS. 4A–4B is a flow chart illustrating yet another embodiment of the method of the present invention.
Figure 4B:
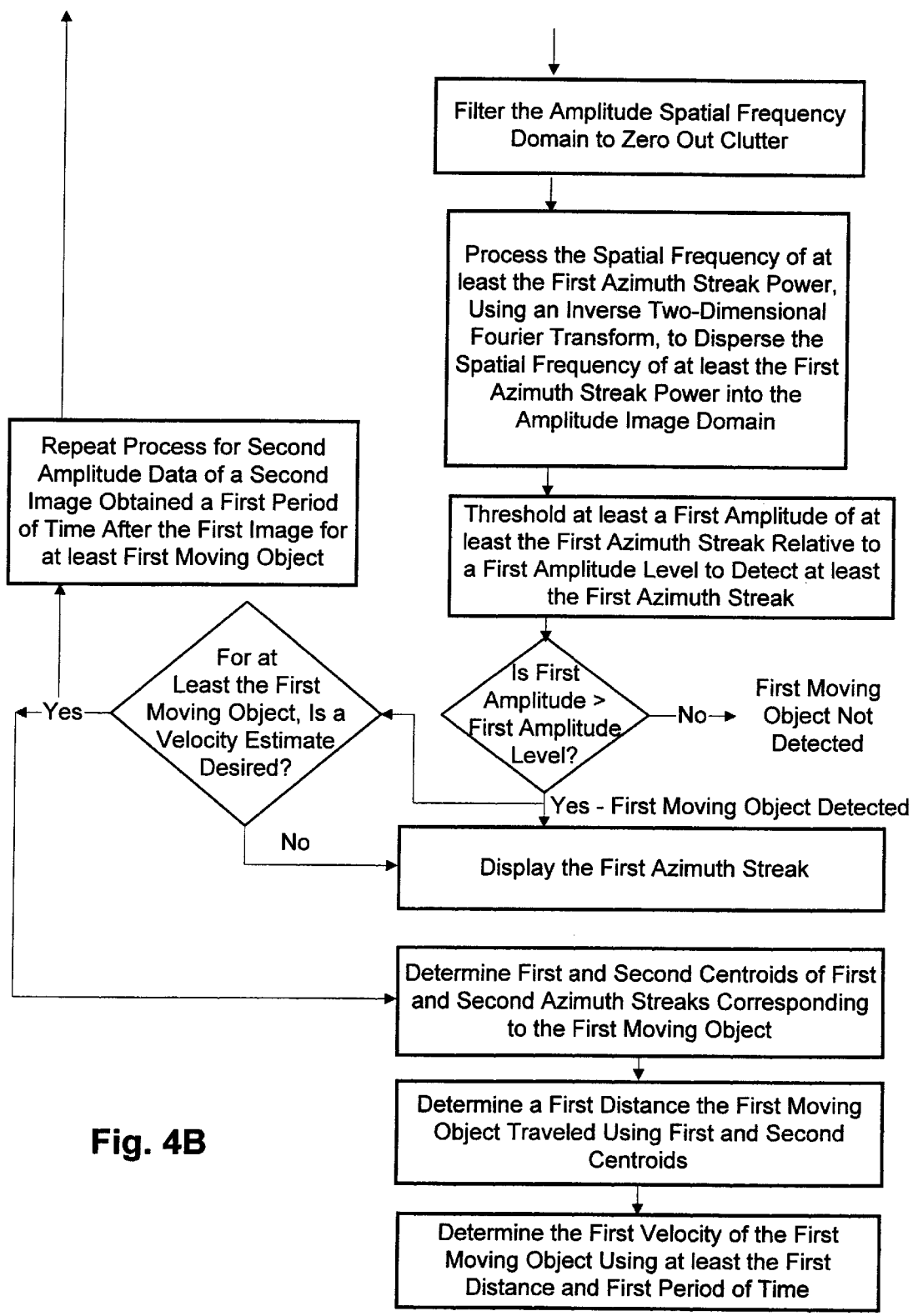
Figure 5:
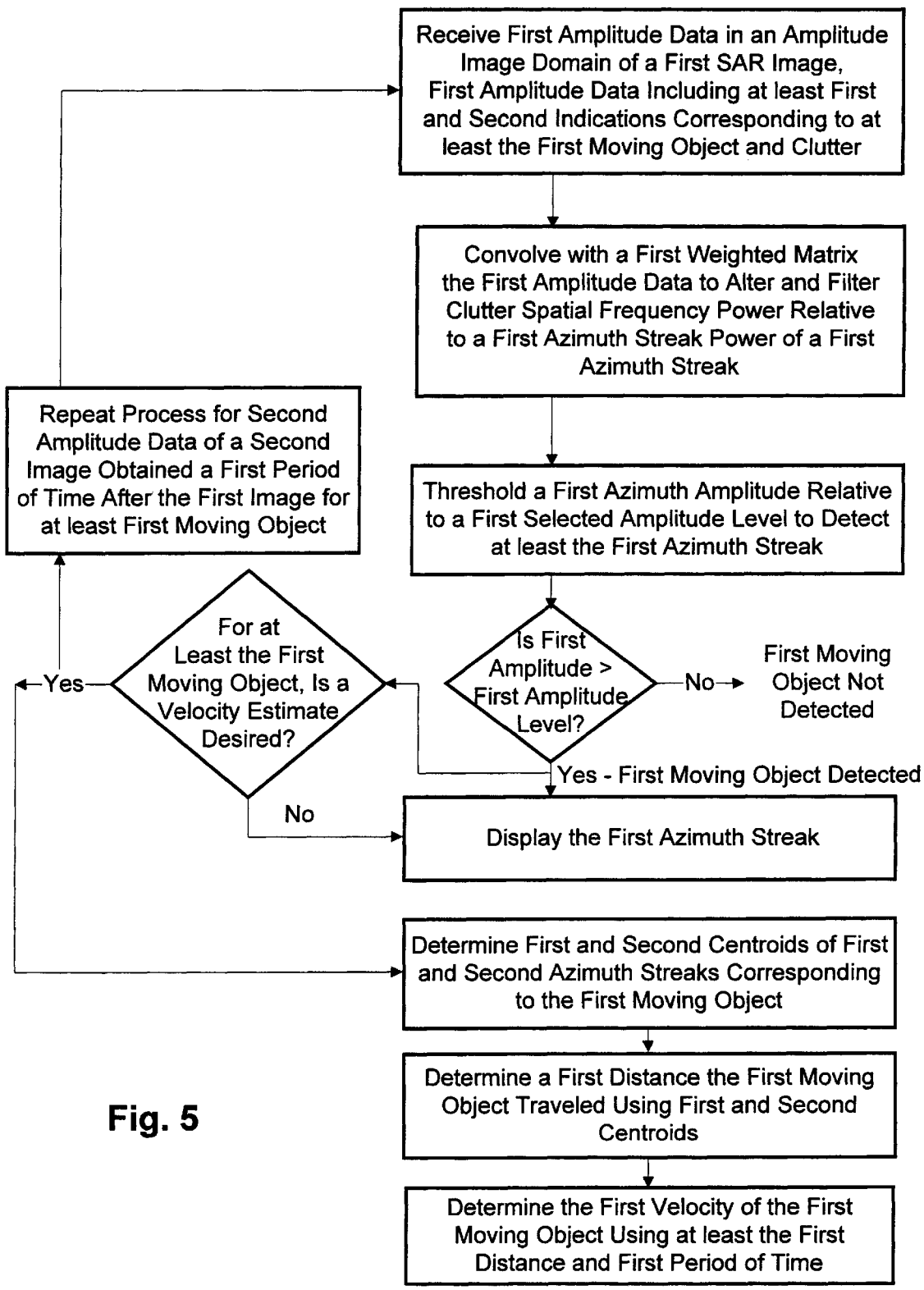
FIG. 5 is a flow chart illustrating still another embodiment of the method of the present invention.

In another embodiment of the method of the present invention, the step of whitening is performed in the amplitude image domain, as opposed to in the amplitude spatial frequency domain, illustrated in FIGS. 2A–2B. More specifically, and as illustrated in FIGS. 4A–4B, the step of whitening is performed on the input amplitude data (e.g., the first amplitude data) of the first image from a SAR system. In this embodiment, the whitening function includes convolving with a first weighted matrix the first and second indications of the first amplitude data corresponding to at least the first object moving at a substantially constant linear velocity and the clutter or background, respectively, to alter or reduce the spatial frequency power of the clutter relative to the first azimuth streak power. The values in the first weighted matrix are synthesized by standard Fourier techniques so that the response in the spatial frequency domain is approximately constant amplitude. Such convolving may be accomplished by a convolution filter. Thereafter, the amplitude data is manipulatable into, within and out of the amplitude spatial frequency domain since the azimuth streaking which occurs in the SAR image (e.g., first image) is very compactly contained in the spatial frequency of the amplitude of the SAR image, substantially as described hereinabove with respect to the methodology described hereinabove with respect to FIGS. 2A–2B. Specifically, in this embodiment, after the whitening step, the method further includes the step of processing the amplitude data (e.g., first and second indications of first image data corresponding to at least the first moving object and clutter) to concentrate a spatial frequency of the first azimuth streak power of at least a first azimuth streak, if any, within the amplitude spatial frequency domain, filtering the amplitude spatial frequency domain to delete everything but that part of the spatial frequency that does not contain azimuth streaking, if any, such that substantially only azimuth streak power (e.g., first azimuth streak power of the first azimuth streak) remains in the amplitude spatial frequency domain, and processing the spatial frequency of at least the first azimuth streak power of the first azimuth streak to disperse the spatial frequency of the first azimuth streak power into the amplitude image domain and obtain an amplitude (e.g., first azimuth amplitude) of the azimuth streak. The above-noted processing steps for concentrating and dispersing may be accomplished using a two-dimensional Fourier transform and an inverse two-dimensional Fourier transform, respectively. The filtering step includes deleting or rejecting that part of the spatial frequency that does not contain azimuth streaking. In this regard, and referring to FIG. 3, the shaded region is set to zero and the unshaded region, which is passed (e.g., unmodified), contains over ninety percent (90%) of the azimuth streaking from all sources which exist in the input SAR image (e.g., first image) as in described hereinabove.

In another embodiment of the method of the present invention, the steps of reducing/altering and separating/filtering the spatial frequency power of the clutter relative to at least the first azimuth streak power may be accomplished in a single step. More specifically, and referring to FIG. 5, the method of the present invention comprises the step of convolving with a weighted matrix the first amplitude data in the amplitude image domain to whiten and filter the spatial frequency power of the clutter relative to the first azimuth streak power of the first azimuth streak which corresponds to a first object moving at a substantially constant linear velocity. The values in the weighted matrix are synthesized by standard Fourier techniques so that the response in the spatial frequency domain is approximately as depicted in FIG. 3. Thereafter, and substantially as described hereinabove, the method further includes the step of thresholding a first azimuth amplitude corresponding to the first azimuth streak with a first selected amplitude level, in accord with standard statistical thresholding techniques, to detect at least the first azimuth streak. At least the first azimuth streak may thereafter be displayed alone or against the background in the image.

In the event at least the first azimuth streak is detected in accordance with the method of the present invention, a rough estimate of the velocity of the first moving object or target may be made using a split aperture technique. Specifically, image data from a SAR system may be split in half and the method of the present invention, described hereinabove, may be applied to each half of the image data. Generally, the velocity estimate is based upon the supposition that a first moving object detected in each half will have moved approximately from the centroid of the detected first azimuth streak in the first aperture to the centroid of the detected second azimuth streak in the second aperture in one-half the integration time, the first and second azimuth streaks corresponding to the first moving object. In particular, and as illustrated in FIGS. 2A–2B, FIGS. 4A–4B and FIG. 5, the method of the present invention may be repeated for second image data from the SAR system, the second image collected a period of time after the first image data was collected. In this regard, if a second azimuth streak corresponding to the first moving object is detected for the second image data, the centroids of the first and second azimuth streaks is determined (e.g., by examining the brightest portion of the first and second azimuth streaks), a distance between the first and second azimuth streaks is measured to determine the first distance the first moving object traveled during the period of time between collection of the first and second images, and the first velocity is determined using the first distance and period of time. For purposes of associating the detected first and second azimuth streaks in the two apertures, the decomposition of the phase history into several sub-apertures, each of which will have the method of the present invention applied to it, and the detected first and second azimuth streaks tracked over several sub-apertures, may be examined.

Figure 6:
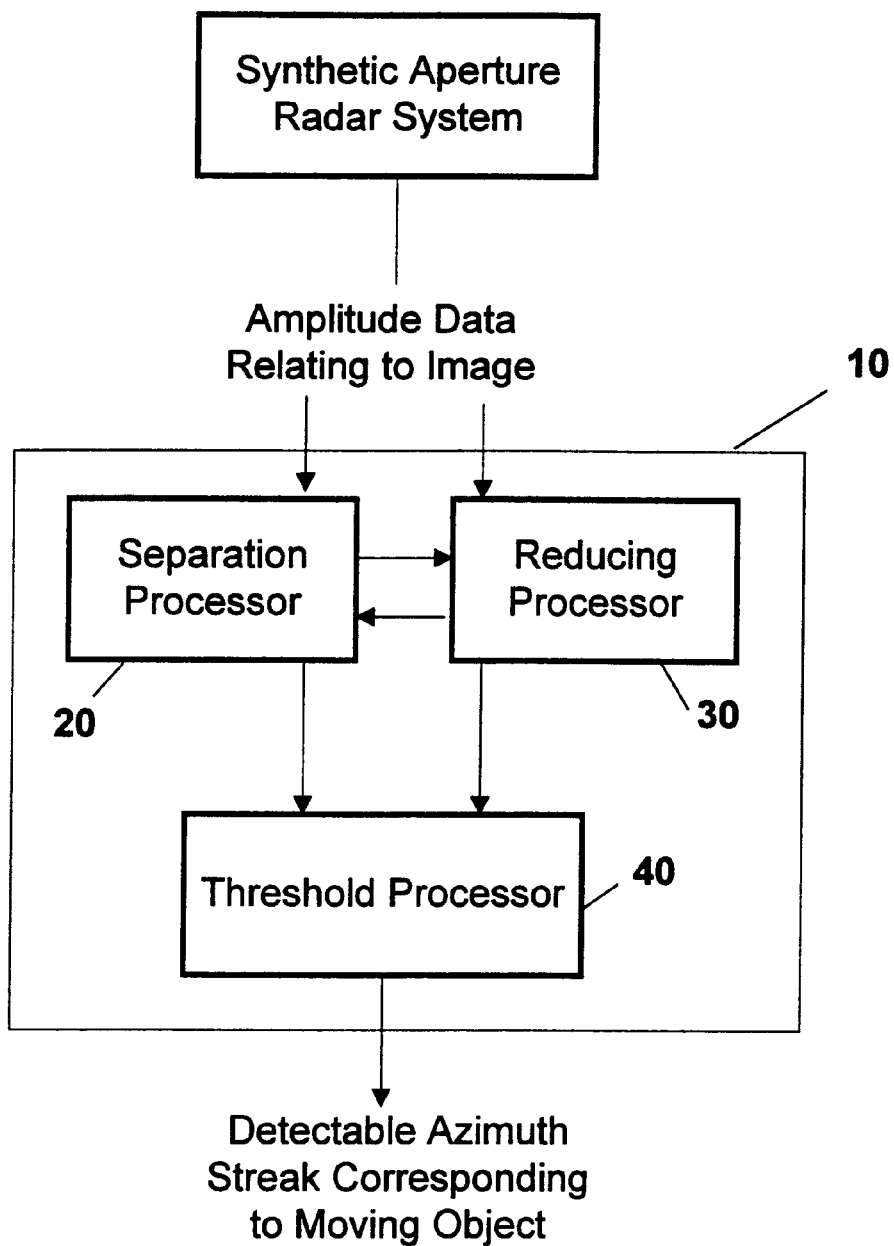
FIG. 6 shows a diagrammatic illustration of one embodiment of the system of the present invention.

In another aspect, the present invention is directed to a system for detecting azimuth streaking due to objects moving at a substantially constant linear velocity. Referring to FIG. 6, the system 10 is capable of receiving amplitude image data (e.g., first amplitude image data) from a SAR system, the amplitude image data include first and second indications corresponding to at least the first object or target moving at a substantially constant linear velocity and clutter. The system 10 generally includes a processor 20 for separating/filtering the first and second indications of the first amplitude data, and a processor 30 for altering/reducing the spatial frequency power of the clutter relative to a first azimuth streak power of a first azimuth streak corresponding to the first moving object. The first amplitude data may be processed initially by either the separation processor 20 or the reducing/altering processor 30, depending upon whether the reduction of the clutter is desired within the amplitude spatial frequency domain or the amplitude image domain. The system 10 also includes a processor 40 for thresholding a first amplitude of the first azimuth streak relative to a first selected amplitude level, whereby the first azimuth streak indicative of a first object moving at a constant linear velocity is detectable if the first amplitude is greater than the first selected amplitude level.

Figure 7:
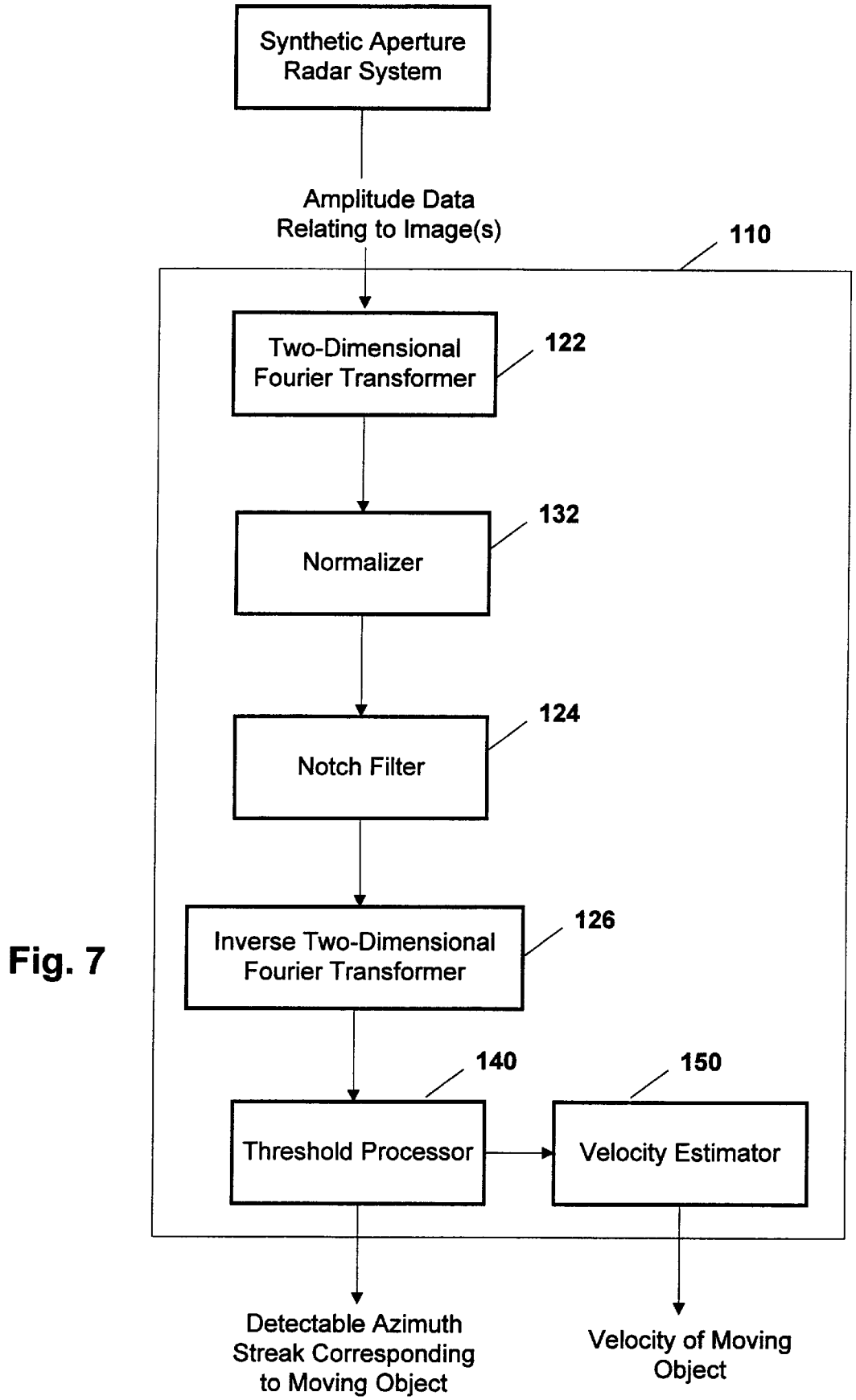
FIG. 7 shows a diagrammatic illustration of another embodiment of the system of the present invention.

Specifically, in one embodiment, illustrated in FIG. 7, the system 110 is designed to reduce the spatial frequency power of the clutter relative to the first azimuth streak power within the amplitude spatial frequency domain. Specifically, for purposes of manipulating the amplitude data of at least the first image within the amplitude spatial frequency domain, the system 110 includes a two-dimensional Fourier transformer 122 for concentrating a spatial frequency of at least the first azimuth streak power of the first azimuth streak, if any, corresponding to the first moving object into the amplitude spatial frequency domain. Such transformer 122 may be a discrete or optical transformer, depending upon whether the image data is digital or analog in nature. The system 110 further includes a normalizer 132, which is capable of whitening, in the amplitude spatial frequency domain, the clutter by normalizing the spatial frequency of at least the first azimuth streak power. In this regard, the normalizer 132 alters/reduces the clutter relative to the first azimuth streak. The system 110 further includes a notch filter 124 for deleting or rejecting within the amplitude spatial frequency domain everything except azimuth streaking. In this regard, the notch filter 124 is capable of zeroing out the clutter since, as illustrated in FIG. 3, less than one percent (1%) of the amplitude spatial frequency domain contains about ninety percent (90%) of power due to azimuth streaking. For purposes of returning the image data, and specifically, the azimuth streak power data, to the amplitude image domain, the system 110 further includes an inverse two-dimensional Fourier transformer 126, which is capable of dispersing the spatial frequency of at least the first azimuth streak power into the amplitude image domain to obtain at least the first amplitude of at least the first azimuth streak. At least the first azimuth amplitude may then be communicated to a threshold processor 140, which utilizes standard thresholding techniques to detect at least the first azimuth streak. In this regard, the processor 140 is capable of comparing at least the first azimuth amplitude corresponding to the first azimuth streak, if any, with a first selected amplitude level. If the first azimuth amplitude is greater than the first selected amplitude level, the first azimuth streak is detectable, and may then be displayed alone or against the background in the image.

In an alternative embodiment, reduction of the spatial frequency power of the clutter relative to the first azimuth streak power is accomplished within the amplitude image domain. Specifically, and referring to FIG. 8, for purposes of manipulating the amplitude data of at least the first image within the amplitude image domain, the system 210 includes an altering/reducing processor 232 which is capable of whitening, in the amplitude image domain, the spatial frequency of the clutter by convolving with a first weighted matrix the first and second indications of the first amplitude data relating to the first image, the first and second indications corresponding to at least the first moving object and clutter, respectively. The values in this weighted matrix are synthesized by standard Fourier techniques so that the response in the spatial frequency domain is approximately constant amplitude. In one embodiment, the processor 232 comprises a convolution filter which functions to alter the spatial frequency power of the clutter. The system 210 further includes a two-dimensional Fourier transformer 222 for processing the amplitude data (e.g., first and second indications of first image data corresponding to at least the first moving object and clutter) to concentrate a spatial frequency of the first azimuth streak power of at least a first azimuth streak, if any, within the amplitude spatial frequency domain, a processor 224 for filtering the amplitude spatial frequency domain to delete everything but that part of the spatial frequency that does not contain azimuth streaking, if any, such that substantially only azimuth streak power (e.g., first azimuth streak power of the first azimuth streak) remains in the amplitude spatial frequency domain, and an inverse two-dimensional Fourier transformer 226 for processing the spatial frequency of at least the first azimuth streak power of the first azimuth streak to disperse the spatial frequency of the first azimuth streak power back into the amplitude image domain. The output from the transformer 226 is the amplitude (e.g., first azimuth amplitude) of the azimuth streak(s). The filtering processor 224 functions to delete or reject that part of the spatial frequency that does not contain azimuth streaking. In one embodiment, the filtering processor 224 comprises a notch filter, which is capable of zeroing out the clutter since, as illustrated in FIG. 3, less than one percent (1%) of the amplitude spatial frequency domain contains about ninety percent (90%) of power due to azimuth streaking.

In another alternative embodiment of the system of the present invention, both reduction/alteration and filtering/separation of the spatial frequency power of the clutter relative to the first azimuth streak power is accomplished within the amplitude image domain. Specifically, and referring to FIG. 9, for purposes of manipulating the amplitude data of at least the first image within the amplitude image domain, the system 310 includes a processor 332 which is capable of whitening, in the amplitude image domain, the spatial frequency of the clutter and filtering the spatial frequency power of the clutter relative to at least the first azimuth streak power of the first azimuth streak by convolving with a first weighted matrix with the first and second indications of the first amplitude data relating to the first image, the first and second indications corresponding to at least the first moving object and clutter, respectively. As noted hereinabove with respect to other embodiments of the present invention, the values in the weighted matrix are synthesized by standard Fourier techniques so that the response in the spatial frequency domain is approximately as depicted in FIG. 3. The output of the processor 332 (e.g., amplitude data relating to at least the first azimuth streak) is then processable by the threshold processor 340, which is capable of detecting at least the first azimuth streak by comparing at least the first azimuth amplitude corresponding to the first azimuth streak with a first selected amplitude level using standard thresholding techniques. In the event the first azimuth amplitude is greater than the first selected amplitude level, the first azimuth streak is detectable, and may further be displayed alone or against the background in the image.

Figure 8:
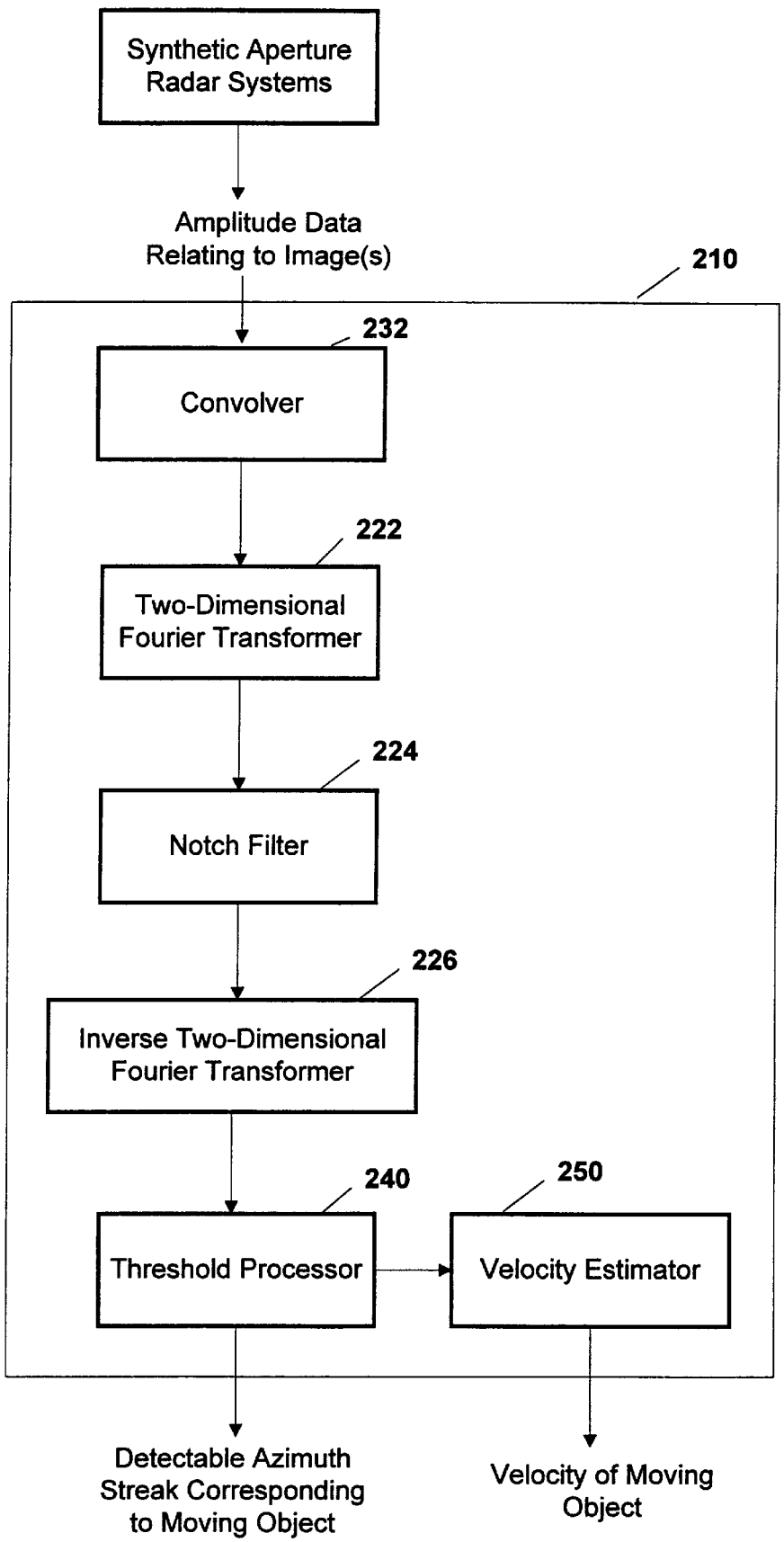
FIG. 8 shows a diagrammatic illustration of yet another embodiment of the system of the present invention.
Figure 9:
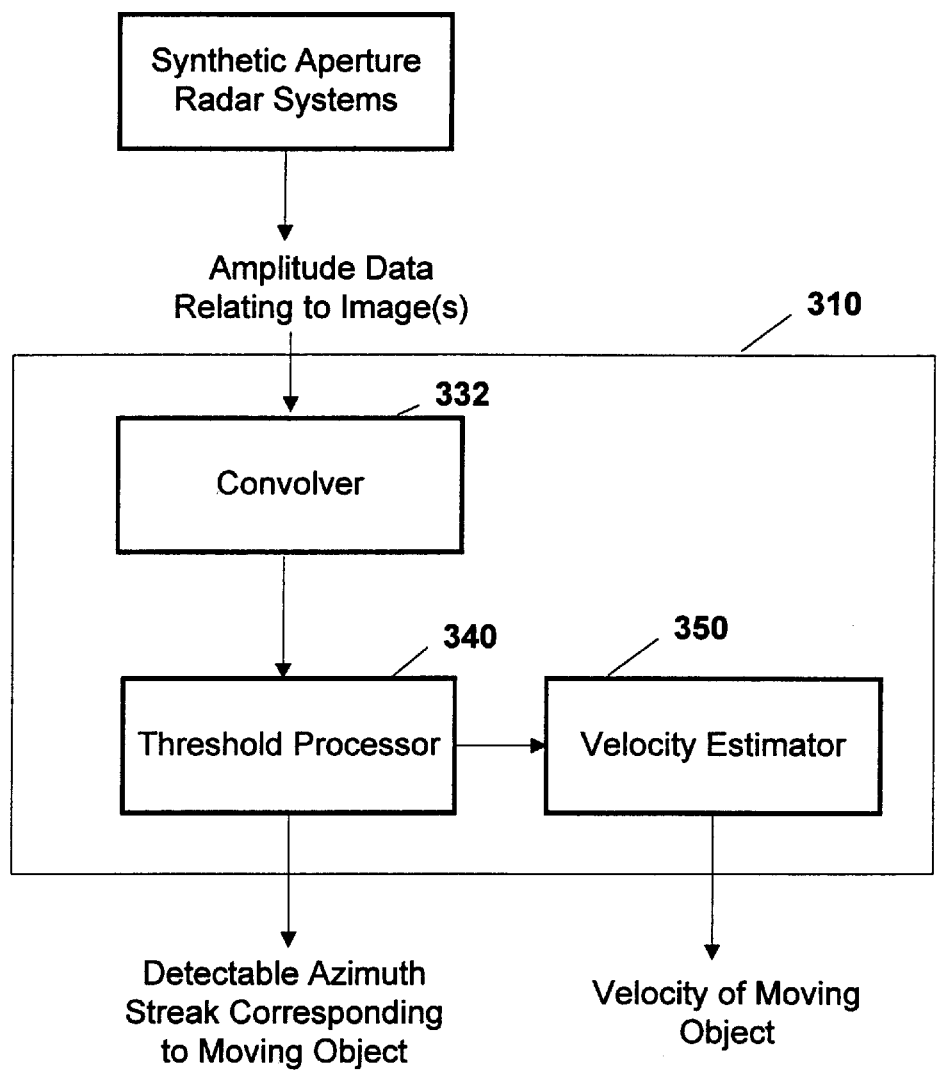
FIG. 9 shows a diagrammatic illustration of another embodiment of the system of the present invention.

In the event a rough estimate of the velocity of at least a first object moving at a substantially constant linear velocity is desired, the systems of the present invention, illustrated in FIGS. 7–9, may further include a velocity estimator 150, 250, 350. Specifically, the systems 110, 210, 310 may be utilized to examine second image data from the SAR system, the second image collected a period of time after the first image data was collected. In this regard, in the event a second azimuth streak corresponding to the first moving object is detected for the second image data, the velocity estimators 150, 250, 350 may be used to determine the centroids of the first and second azimuth streaks (e.g., by examining the brightest portion of the first and second azimuth streaks), determine a distance between the first and second azimuth streaks, which is correlatable to the first distance the first moving object traveled during the period of time between collection of the first and second images, and to determine the first velocity using the first distance and period of time.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for detecting at least a first moving object using a synthetic aperture radar system, the first moving object having a substantially constant linear velocity, comprising the steps of:

processing at least first amplitude data in an amplitude image domain relating to first image data from the synthetic aperture radar system, said first amplitude data having at least a first indication of at least the first moving object corresponding to a first azimuth streak having a first azimuth streak power, and at least a second indication corresponding to clutter, said processing step for concentrating a spatial frequency of at least said first azimuth streak power of at least said first azimuth streak within an amplitude spatial frequency domain; and whitening, in said amplitude spatial frequency domain, at least a portion of said second indication corresponding to clutter to reduce a spatial frequency power of the clutter relative to said first azimuth streak power, wherein at least said first azimuth streak corresponding to the first moving object is detectable.

2. A method, as claimed in claim 1, wherein said processing at least said first amplitude data comprises the step of performing one of:

a two-dimensional discrete Fourier transform on at least said first indication corresponding to at least said first azimuth streak in said amplitude image domain to arrange at least said spatial frequency of at least said first azimuth streak power of at least said first azimuth streak within said amplitude spatial frequency domain, wherein the synthetic aperture radar system is digital; and a two-dimensional optical Fourier transform on at least said first indication corresponding to at least said first azimuth streak in said amplitude image domain to arrange at least said spatial frequency of at least said first azimuth streak power of at least said first azimuth streak within said amplitude spatial frequency domain, wherein the synthetic aperture radar system is analog.

3. A method, as claimed in claim 1, wherein said whitening step comprises the step of dispersing said spatial frequency power of the clutter, such that said spatial frequency power of the clutter is less than said first azimuth streak power of said first azimuth streak.

4. A method, as claimed in claim 1, wherein said whitening step comprises the step of normalizing said spatial frequency of said first azimuth streak power to disperse said spatial frequency of the clutter relative to said first azimuth streak power, such that said first azimuth streak power of said first azimuth streak is greater than said spatial frequency power of said clutter.

5. A method, as claimed in claim 1, further comprising the step of filtering said amplitude spatial frequency domain to retain substantially only at least said first azimuth streak power in said amplitude spatial frequency domain.

6. A method, as claimed in claim 5, wherein said whitening step occurs after said filtering step.

7. A method, as claimed in claim 1, further comprising the step of:

processing at least said spatial frequency of said first azimuth streak power to disperse said spatial frequency of said first azimuth streak power into said amplitude image domain, wherein at least said first azimuth has a first azimuth amplitude.

8. A method, as claimed in claim 7, wherein said processing at least said spatial frequency of said first azimuth streak power comprises the step of performing one of:

an inverse two-dimensional discrete Fourier transform on at least said spatial frequency of said first azimuth streak power in said spatial frequency domain to obtain at least said first azimuth amplitude of said first azimuth in said amplitude image domain, wherein the synthetic aperture radar system is digital; and an inverse two-dimensional optical Fourier transform on at least said spatial frequency of said first azimuth streak power in said spatial frequency domain to obtain at least said first azimuth amplitude of said first azimuth in said amplitude image domain, wherein the synthetic aperture radar system is analog.

9. A method, as claimed in claim 7, further comprising the step of:

processing at least said first azimuth amplitude of said first azimuth streak in said amplitude image domain to detect at least said first azimuth streak.

10. A method, as claimed in claim 9, wherein said processing at least said first azimuth amplitude of said first azimuth streak to detect at least said first azimuth streak comprises the step of thresholding said first azimuth amplitude of said first azimuth streak in said amplitude image domain relative to a first selected amplitude level to detect at least said first azimuth streak, wherein at least said first azimuth streak is detectable when said first azimuth amplitude of said first azimuth is greater than said first selected amplitude level.

11. A method, as claimed in claim 1, wherein said second indication corresponds to at least one of moving foliage, nonmoving foliage, a building, a road, a vehicle moving nonlinearly and a vehicle moving at a nonconstant velocity.

12. A method, as claimed in claim 1, wherein said processing and whitening steps are repeated for at least second amplitude data relating to at least second image data obtained a first period of time after said first image data from the synthetic aperture radar system, said second amplitude data having at least a first indication of the first moving object corresponding to a second azimuth streak, wherein said first and second azimuth streaks in said first and second images correspond to the first moving object in first and second positions, respectively, said method further comprising the step of:

determining, from at least said first and second positions of said first and second azimuths streaks corresponding to the first moving object and said first period of time, a first velocity of the first moving object.

13. A method, as claimed in claim 12, wherein said determining step comprises the steps of:

determining first and second centroids of said first and second azimuth streaks, respectively;

determining a first distance the first moving object has traveled, said first distance corresponding to said first and second centroids; and determining said first velocity of at least the first moving object using at least said first distance and said first period of time.

14. A method for detecting at least a first moving object using a synthetic aperture radar system, the first moving object having a substantially constant linear velocity relative to a ground surface, comprising the steps of:

whitening, in an amplitude image domain, first amplitude data corresponding to first image data from the synthetic aperture radar, said first amplitude data including at least one of first and second indications of the first moving object and clutter, respectively, wherein at least said first indication corresponds to a first azimuth streak having a first azimuth streak power, said whitening step for altering a spatial frequency power of the clutter relative to said first azimuth streak power of said first azimuth streak; and processing said first and second indications corresponding the first moving object and the clutter to separate at least said first indication from said second indication, wherein at least said first azimuth streak corresponding to the first moving object is detectable.

15. A method, as claimed in claim 14, wherein said whitening step comprises convolving with a first weighted matrix, in said amplitude image domain, said first and second indications corresponding to at least the first moving object and the clutter, respectively, to alter said spatial frequency power of the clutter relative to said first azimuth streak power of said first azimuth streak, such that said spatial frequency power of the clutter is less than said first azimuth streak power of said first azimuth streak.

16. A method, as claimed in claim 14, wherein said processing step comprises the steps of:

processing at least one of said first and second indications corresponding to the first moving object and the clutter, respectively, to concentrate a spatial frequency of at least said first azimuth streak power of at least said first azimuth streak within an amplitude spatial frequency domain;

filtering said amplitude spatial frequency domain to retain substantially only said at least said first azimuth streak power in said amplitude spatial frequency domain; and processing at least said spatial frequency of said first azimuth streak power to diffuse said spatial frequency of said first azimuth streak power into said amplitude image domain, wherein at least said first azimuth streak has a first azimuth amplitude.

17. A method, as claimed in claim 16, wherein said processing at least one of said first and second indications step comprises the step of performing a two-dimensional Fourier transform on at least said first indication corresponding to at least said first azimuth streak in said amplitude image domain to arrange at least said spatial frequency of at least said first azimuth streak power of at least said first azimuth streak within said amplitude spatial frequency domain.

18. A method, as claimed in claim 16, wherein said processing at least said spatial frequency of said first azimuth streak power step comprises the step of performing an inverse two-dimensional Fourier transform on at least said spatial frequency of said first azimuth streak power in said spatial frequency domain to obtain at least said first azimuth amplitude of said first azimuth streak in said amplitude image domain.

19. A method, as claimed in claim 14, wherein said whitening step occurs after said processing step.

20. A method, as claimed in claim 16, further comprising the step of:

thresholding said first azimuth amplitude in said amplitude image domain relative to a first selected amplitude level, wherein at least said first azimuth streak is detectable when said first azimuth amplitude is greater than said first selected amplitude level.

21. A method, as claimed in claim 14, wherein said whitening and processing steps are repeated for at least second amplitude data relating to at least second image data obtained a first period of time after said first image data from the synthetic aperture radar system, said second amplitude data having at least a first indication of the first moving object corresponding to a second azimuth streak, wherein said first and second azimuth streaks in said first and second images correspond to the first moving object in first and second positions, respectively, said method further comprising the step of:

determining, from at least said first and second positions of said first and second azimuths streaks corresponding to the first moving object and said first period of time, a first velocity of the first moving object.

22. A method, as claimed in claim 14, wherein at least the first moving object is one of a land-based, sea-based and air-based vehicle.

23. A method for finding at least a first moving object using one of an air-based and a space-based synthetic aperture radar system, the first moving object having a substantially constant linear velocity, comprising the steps of:

processing at least first amplitude data relating to a first image from the synthetic aperture radar system, said first amplitude data including first and second indications of the first moving object and clutter, respectively, wherein said first indication corresponds to a first azimuth streak having a first azimuth streak power, said processing step for separating at least said first indication corresponding to the first moving object from said second indication corresponding to the clutter; and altering a spatial frequency power of the clutter relative to said first azimuth streak power of said first azimuth streak, wherein at least said first azimuth streak corresponding to the first moving object is detectable.

24. A method, as claimed in claim 23, wherein said altering step comprises the step of whitening at least one of said first and second indications corresponding to the first moving object and the clutter, such that said spatial frequency power of the clutter is less than said first azimuth streak power of said first azimuth streak.

25. A method, as claimed in claim 23, wherein said altering step occurs one of before and after said processing step, and comprises the step of convolving with a first weighted matrix, in an amplitude image domain, at least one of said first and second indications corresponding to the first moving object and the clutter to whiten said spatial frequency power of the clutter, such that said first azimuth streak power of said first azimuth streak is greater than said spatial frequency power of the clutter.

26. A method, as claimed in claim 23, wherein said processing step comprises the step of concentrating a spatial frequency of at least said first azimuth streak power of at least said first azimuth streak within an amplitude spatial frequency domain, said altering step comprising the step of normalizing, in said amplitude spatial frequency domain, said spatial frequency of said first azimuth streak power to disperse said spatial frequency power of the clutter relative to said first azimuth streak power, such that said first azimuth streak power of said first azimuth streak is greater than said spatial frequency power of the clutter.

27. A method for detecting at least a first moving object using a synthetic aperture radar system, the first moving object moving at a substantially constant linear velocity, comprising the steps of:

convolving with a first weighted matrix at least first amplitude data relating to a first image from the synthetic radar system, said first amplitude data including first and second indications of at least the first moving object and clutter, respectively, the first indication corresponding to a first azimuth streak having a first azimuth streak power and the second indication corresponding to the clutter having a clutter spatial frequency power, said convolving step for altering and filtering said clutter spatial frequency power relative to said first azimuth streak power of said first azimuth streak; and thresholding a first azimuth amplitude of said first azimuth streak relative to a first selected amplitude level to detect said first azimuth streak.

28. A method, as claimed in claim 27, further comprising the step of:

receiving at least said first amplitude data from the synthetic aperture radar system.

29. A method, as claimed in claim 27, further comprising the step of:

displaying at least said first azimuth streak.

30. A system for detecting at least a first moving object using a synthetic aperture radar system, the first moving object having a substantially constant linear velocity, comprising:

means for processing at least first amplitude data relating to at least a first image from the synthetic aperture radar system, said first amplitude data including at least first and second indications of the first moving object and clutter, respectively, to separate said first indication from said second indication of said first amplitude data, wherein said first indication corresponds to a first azimuth streak having a first azimuth streak power; and means for altering a spatial frequency power of the clutter relative to said first azimuth streak power of said first azimuth streak, wherein at least said first azimuth streak corresponding to the first moving object is detectable.

31. A system, as claimed in claim 30, wherein said means for processing comprises:

a means for concentrating a spatial frequency of at least said first azimuth streak power of at least said first azimuth streak from an amplitude image domain into an amplitude spatial frequency domain;

a means for filtering said amplitude spatial frequency domain to retain substantially only at least said first azimuth streak power in said amplitude frequency domain; and a means for dispersing said spatial frequency of at least said first azimuth streak power into said amplitude image domain.

32. A system, as claimed in claim 31, wherein said means for concentrating comprises a Fourier transform means for performing a two-dimensional Fourier transform on at least said first indication to arrange at least said spatial frequency of at least said first azimuth streak power of at least said first azimuth streak within said amplitude spatial frequency domain.

33. A system, as claimed in claim 31, wherein said means for dispersing comprises an inverse Fourier transform means for performing a two-dimensional inverse Fourier transform on at least said spatial frequency of at least said first azimuth streak power in said spatial frequency domain to obtain at least a first amplitude of said first azimuth streak in said amplitude image domain.

34. A system, as claimed in claim 33, further comprising:
   means for thresholding a first azimuth amplitude of said first azimuth streak in an amplitude image domain relative to a first selected amplitude level to detect at least said first azimuth streak corresponding to the first moving object, wherein at least said first azimuth streak is detectable when said first azimuth amplitude of said first azimuth streak is greater than said first selected amplitude level.

35. A system, as claimed in claim 31, wherein said means for filtering comprises a notch filter.

36. A system, as claimed in claim 30, wherein said means for altering comprises a means for normalizing, in an amplitude spatial frequency domain, a spatial frequency of at least said first azimuth streak power to whiten said spatial frequency power of the clutter relative to at least said first azimuth streak power, such that said spatial frequency power of the clutter is less than at least said first azimuth streak power.

37. A system, as claimed in claim 30, wherein said means for altering comprises a means for convolving, in an amplitude image domain, a first weighted matrix with said first and second indications corresponding to the first moving object and the clutter, respectively, to whiten said spatial frequency power of the clutter relative to at least said first azimuth streak power of said first azimuth streak, such that said spatial frequency power of the clutter is less than at least said first azimuth streak power.

* * * * *